United States Patent
Ifju et al.

(10) Patent No.: US 7,487,937 B2
(45) Date of Patent: Feb. 10, 2009

(54) AIRFOIL FOR MICRO AIR VEHICLE

(75) Inventors: Peter G. Ifju, Newberry, FL (US); Bret K. Stanford, Gainesville, FL (US); Roberto Albertani, Valparaiso, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 261 days.

(21) Appl. No.: 11/394,018

(22) Filed: Mar. 30, 2006

(65) Prior Publication Data
US 2007/0228212 A1 Oct. 4, 2007

(51) Int. Cl.
*B64C 3/38* (2006.01)
*B64C 3/52* (2006.01)
*B64C 1/26* (2006.01)
*B64C 31/028* (2006.01)

(52) U.S. Cl. .................. 244/38; 244/76 C; 244/215; 244/219; 244/123.1

(58) Field of Classification Search .............. 446/66, 446/57; 244/11, 22, 38, 123.1, 123.2, 76 C, 244/213, 203, 49, 39, 46, 218, 131, 174, 244/155 A, 154, 215, 219
See application file for complete search history.

(56) References Cited

U.S. PATENT DOCUMENTS

| | | | | |
|---|---|---|---|---|
| 5,433,401 | A * | 7/1995 | Ricketts | 244/153 R |
| 6,089,503 | A * | 7/2000 | Volk | 244/48 |
| 6,938,853 | B2 | 9/2005 | Pines et al. | |
| 7,007,889 | B2 * | 3/2006 | Charron | 244/16 |
| 2003/0068954 | A1 * | 4/2003 | Oblack | 446/34 |
| 2004/0079838 | A1 * | 4/2004 | Simpson et al. | 244/123 |
| 2006/0145029 | A1 * | 7/2006 | Lonsinger | 244/219 |

OTHER PUBLICATIONS

Mohseni, et al. "Flow Simulation Around a Micro Air Vehicle in a Plume Characterization Scenario", AIAA, 2004-6598, pp. 1-9.
Ifju et al., "Flexible-Wing-Based Micro Air Vehicles", AIAA, 2002-0705, pp. 1-13.
Albertani et al. "Wind Tunnel System Characteization Applied to Powered Micro Aerial Vehicles with LAR Fixed Flexible Wings", 20th Bristol UAV Systems Conference, Apr. 2006, pp. 1-17.

(Continued)

*Primary Examiner*—Michael R Mansen
*Assistant Examiner*—Richard R Green
(74) *Attorney, Agent, or Firm*—Akerman Senterfitt; Michael K. Dixon (57) ABSTRACT

An airfoil for a micro air vehicle that includes components enabling the airfoil to adjust the angle of attack (AOA) of the airfoil in response to wind gusts, thereby enabling the airfoil to provide smooth flight. The airfoil may include a first compliant region positioned between an inboard section and a first outboard section and may include a second compliant region between a second outboard section and the inboard section. The compliant regions enable the first and second outboard sections to bend about a leading edge section and move relative to an inboard section. This action creates smoother flight due to numerous aerodynamic advantages such as a change in the angle of attack and improved wind gust rejection due to adaptive washout as a result of the airfoil flexing, twisting and decambering.

37 Claims, 5 Drawing Sheets

OTHER PUBLICATIONS

Reaves et al. "Model Update of a Micro Air Vehicle (MAV) Flexible Wing Frame with Uncertainty Quantification", NASA/TM-2004-213232, pp. 1-13.

Lind, "Roll Control for Micro Air Vehicles Using Active Wing Morphing", pp. 1-8, http://128.227.42.147/rick/rick_pro/rick_mav.html visited Mar. 9, 2006.

"Biomimmetrically Inspired Aerial and Underwater Vehicles", Micro Aerial and Underwater Vehicles, pp. 1-9, http://enstrophy.colorado.edu/~mohseni/Mirco Vehicles1.html visited Mar. 9, 2006.

Abdulrahim et al."Development of Mission-Capable Flexible-Wing Micro Air Vehicles", 53rd Southeastern Regional Student Conference, Apr. 2002, pp. 1-11.

"Flapping Wing Aerodynamics and Controlled Air Vehicles", pp. 1-3, http://www.dodtechmatch.com/DOD/Opportunities/SBIRView.aspx?id+=AF06-T021, visited Mar. 9, 2006.

Schufflebarger "Tests of a Gust-Alleviating Wing in the Gust Tunnel", National Advisory Committee for Aeronautics, Technical Note No. 802, 21 pages.

Albertani et al. "Wind Tunnel Aerodynamic and Geometric Characterization of a Flexible Wing Micro Air Vehicle", UF-AFRL Collaborative Research Forum REEF, Shalimar, FL, Aug. 2005, pp. 1-34.

\* cited by examiner

$C_L$ = COEFFICIENT OF LIFT

AoA = ANGLE OF ATTACK

PR 07 = PERIMETER REINFORCED AIRFOIL WITHOUT COMPLIANT REGIONS

BR 09 = BATTEN REINFORCED AIRFOIL WITHOUT COMPLIANT REGION

PR 10 = PERIMETER REINFORCED AIRFOIL WITH COMPLIANT REGION

AIRFOIL FOR MICRO AIR VEHICLE

STATEMENT REGARDING FEDERALLY SPONSORED RESEARCH OR DEVELOPMENT

This invention was made with U.S. government support under grant number F49620-03-1-0381 awarded by the United States Air Force Office of Scientific Research. The U.S. government has certain rights in the invention.

FIELD OF THE INVENTION

This invention is directed generally to micro air vehicles, and more particularly, to airfoil configurations for micro air vehicles.

BACKGROUND

Micro air vehicles generally are relatively small unmanned flying objects, such as those having wingspans less than about ten inches. Micro air vehicles are often powered by small gasoline or electric propeller driven engines. Micro air vehicles are relatively lightweight vehicles capable of being used for a variety of purposes, such as for recreation, reconnaissance, and other purposes. Because of their small size, micro air vehicles lend themselves to a variety of uses. For instance, micro air vehicles have been used to carry cameras and other payload on a battlefield and in other surveillance operations.

Many micro air vehicles are formed from rigid airfoils that create erratic flight in gusty wind conditions. Small rigid airfoils sized to be used with micro air vehicles typically lack the capability to produce smooth flight in gusty conditions. However, smooth flight is desired during surveillance operations to enable a camera contained within the micro air vehicle to take high quality pictures. Thus, a need exists for an airfoil for micro air vehicles that is capable of providing smooth flight in gusty wind conditions.

SUMMARY OF THE INVENTION

This invention is directed to an airfoil for a micro air vehicle that includes components enabling the airfoil to adjust the angle of attack (AOA) of the airfoil in response to wind gusts, thereby enabling the airfoil to provide smooth flight. In addition, the airfoil may enable a micro air vehicle to fly at increased angles of attack relative to conventional airfoils before stall is encountered, and as such, can aid in transition to a hover mode. The airfoil may include a leading edge section, an inboard section positioned between a first and second outboard sections and aft of the leading edge section. The leading edge section may be formed from a first material, wherein the leading edge section may be configured to bend in a first direction such that ends of the leading edge may be bent towards a pressure side of the airfoil but may not bend substantially in a second, generally opposite direction toward the suction side of the airfoil. The airfoil may include a first compliant region positioned between the inboard section and the first outboard section and may include a second compliant region between the second outboard section and the inboard section. The first and second compliant regions may enable the first and second outboard sections to move relative to the inboard section by bending about a leading edge section forming a leading edge of the airfoil. This movement of the first and second outboard sections creates smoother flight due to a change in the angle of attack reduced drag due to the curvature of a leading edge section and improved wind gust rejection due to adaptive washout as a result of the airfoil flexing, twisting and decambering.

The first and second compliant regions may be formed from one or more compliant regions positioned between the first outboard section and the inboard section and the second outboard section and the inboard section, respectively. The first and second compliant regions may extend from proximate the leading edge section to the trailing edge enabling the first and second outboard sections to move relative to the inboard section about the leading edge section. The first or second compliant region, or both, may be formed from one or more slots extending from proximate the leading edge section to the trailing edge. One or more seals may be positioned between first and second outboard sections and the inboard section. The seals may include an end plate extending from a suction side of the airfoil. In another embodiment, the first compliant region, may be formed from material attached to the first outboard section and attached to the inboard section, wherein a length of the material is greater than a distance between the first outboard section and the inboard section, thereby permitting the first outboard section to move relative to the inboard section by bending about the leading edge section. The second compliant region, may likewise be formed from a material attached to the second outboard section and attached to the inboard section, wherein a length of the material is greater than a distance between the second outboard section and the inboard section, thereby permitting the second outboard section to move relative to the inboard section by bending about the leading edge section.

The first and second outboard sections may also include first and second camber adjustable regions formed from a flexible material that changes camber upon interaction with a wind gust. The first and second camber adjustable regions may be formed from a flexible material, such as, but not limited to, latex. The first and second camber adjustable regions may extend from the leading edge section toward the trailing edge, and may form the trailing edge in some embodiments. The first and second camber adjustable regions may be formed from a resilient, flexible material having a camber forming a concave surface facing downward that improves wind gust rejection due to adaptive washout as a result of the material flexibly decambering. The first or section outboard section, or both, may include one or more battens extending from the leading edge section toward the trailing edge and may be attached to the at least one layer of a resilient, flexible material.

The airfoil may also include a first outboard perimeter support structure extending along a perimeter of the first outboard section and attached to the leading edge section. The airfoil may also include a second outboard perimeter support structure extending along a perimeter of the second outboard section and attached to the leading edge section. The first and second outboard perimeter support structures may provide structural support to the first and second camber adjustable regions. In at least one embodiment, the leading edge section, the inboard section, the first outboard perimeter support structure, and the second outboard perimeter support structure comprise a monolithic structure, which may be formed from a carbon fiber epoxy.

An advantage of this invention is that the angle of attack of the airfoil may be changed in response to wind gusts, thereby enabling the airfoil to provide smoother flight than other airfoils.

Another advantage of this invention is that the airfoil with the first and second outboard sections separated from an inboard section creates greater lifting force than comparable airfoils without the first and second outboard sections.

Yet another advantage of this invention is that the airfoil may enable a micro air vehicle to fly at increased angles of attack relative to conventional airfoils before stall is encountered, and as such, can aid in transition to a hover mode.

Another advantage of this invention is that a micro air vehicle incorporating the airfoil of this invention may fly at slower speeds while maintaining the ability to reject wind gusts through the motion of the first and second outboard sections.

Still another advantage of this invention is that the bendable airfoil may be produced relatively inexpensively.

Another advantage of this invention is that the airfoil is durable and capable of withstanding crash landings.

These and other advantages will become obvious upon review of the detailed written description below of these and other embodiments.

BRIEF DESCRIPTION OF THE DRAWINGS

The accompanying drawings, which are incorporated in and form a part of the specification, illustrate preferred embodiments of the presently disclosed invention and, together with the description, disclose the principles of the invention.

DETAILED DESCRIPTION OF THE INVENTION

Figure 1:
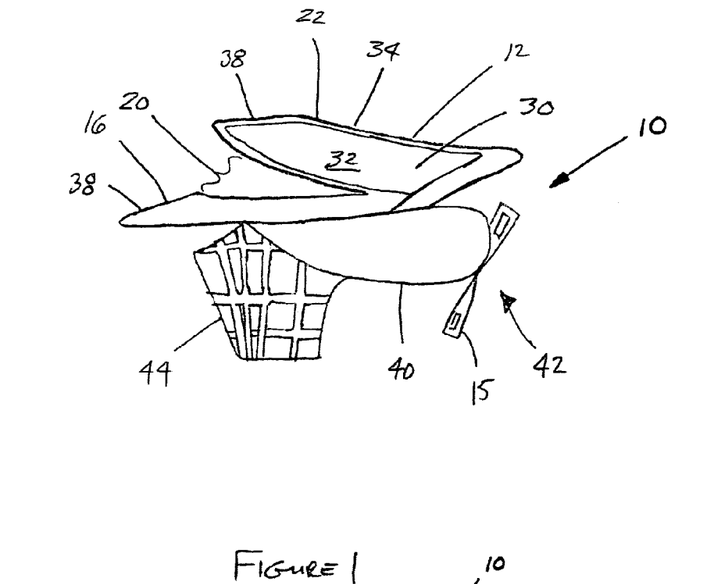
FIG. 1 is a perspective view of a micro air vehicle of this invention with a second outboard section bent toward a pressure side of the airfoil about a leading edge section.
Figure 2:
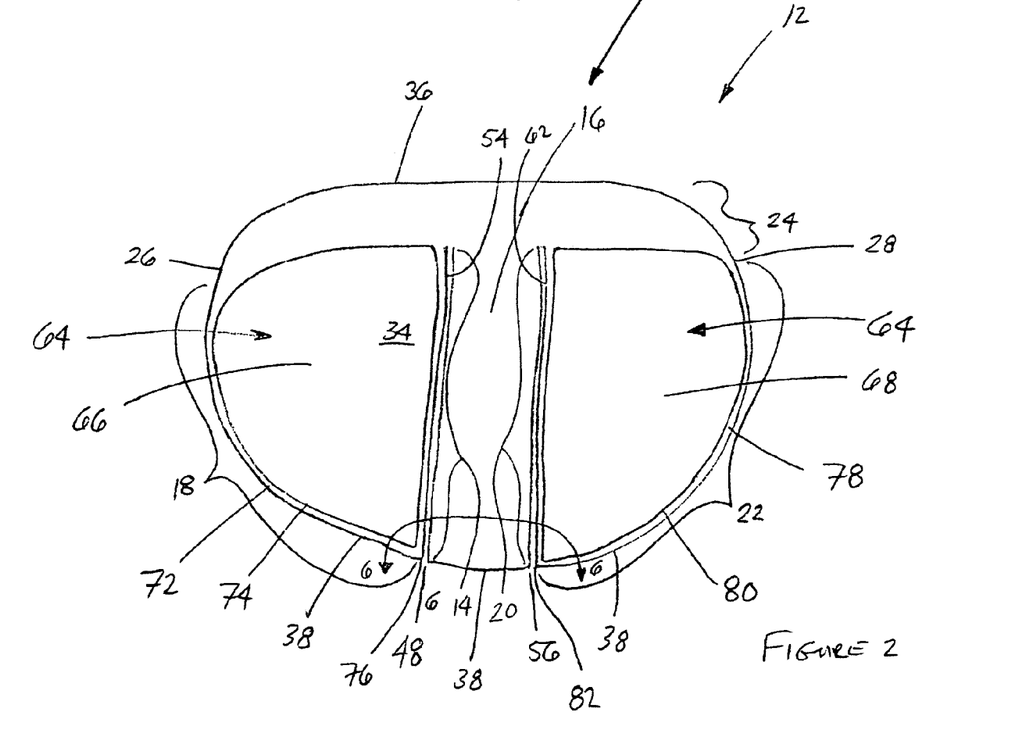
FIG. 2 is a top view of an airfoil of this invention.
Figure 6:
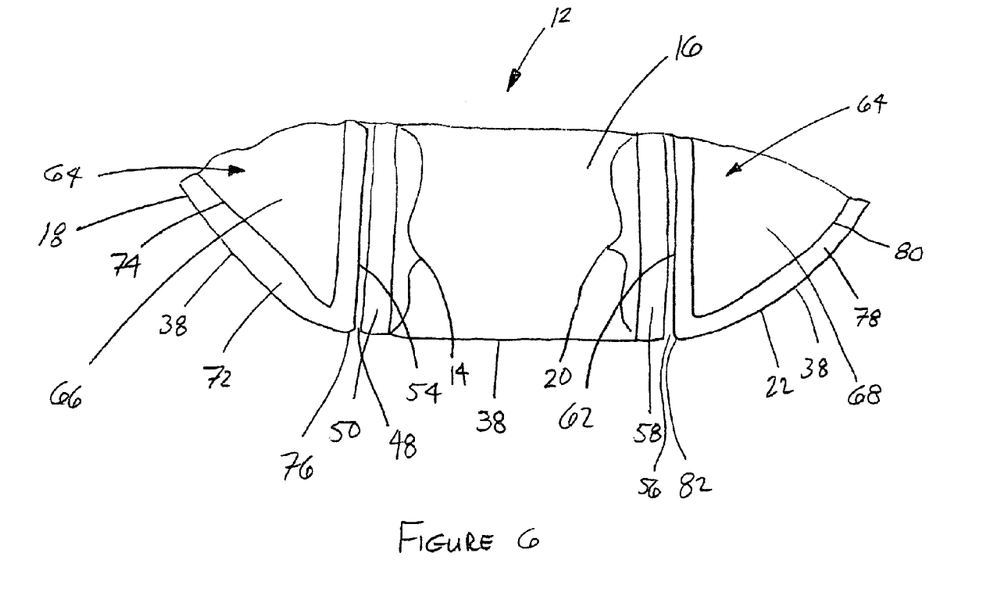
FIG. 6 is a detailed view of a trailing edge of the airfoil taken at line 6-6 in FIG. 2.
Figure 7:
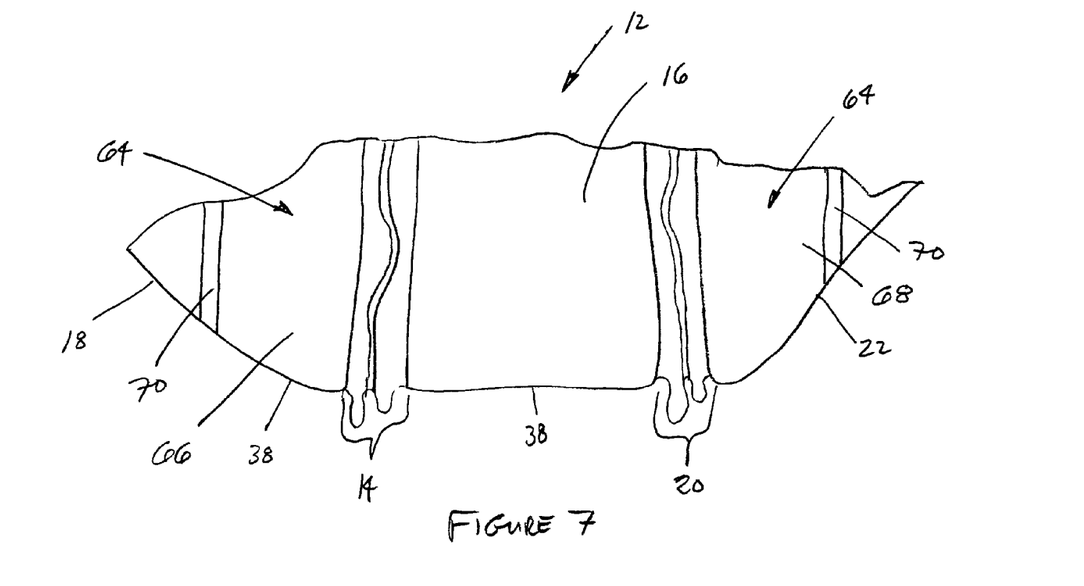
FIG. 7 is a detailed view of a trailing edge of the airfoil taken at line 7-7 in FIG. 3.
Figure 8:
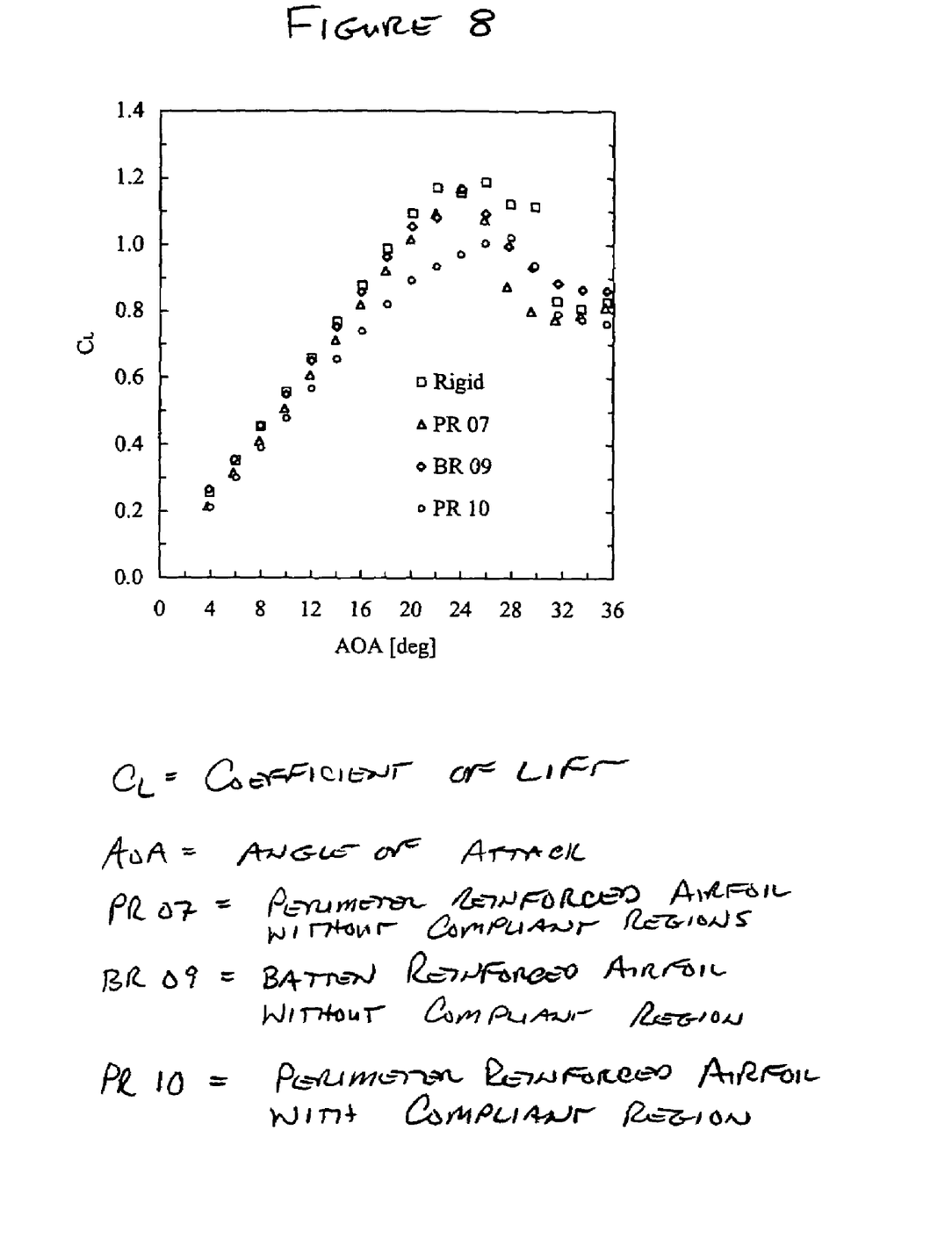
FIG. 8 is a graph of the coefficient of lift vs. the angle of attack for three airfoil designs compared against an airfoil design having compliant regions of this invention. All four airfoils had the same overall geometric shape. The rigid airfoil was rigid in its entirety. The PR 07 airfoil had a camber adjustable region aft of a leading edge region and was supported by a perimeter reinforcement. The BR 09 airfoil had a camber adjustable region aft of a leading edge region and was supported by batten reinforcements. The PR 10 airfoil had compliant regions of the invention.

As shown in FIGS. 1-8, this invention is directed to an airfoil 12 for a micro air vehicle 10 that includes components enabling the airfoil 12 to adjust the angle of attack (AOA) of the airfoil in response to a wind gust, thereby enabling the airfoil 12 to provide smooth flight. In addition, the airfoil 12 may enable a micro air vehicle to fly at increased angles of attack relative to conventional airfoils before stall is encountered, as shown in FIG. 8, and as such, can aid in transition to a hover mode. In particular, stall occurs when the coefficient of lift decreases as the angle of attack increases. Thus, it can be seen in FIG. 8, that the PR 10 airfoil, as shown in FIG. 2, was able to achieve higher angles of attack before encountering stall.

The airfoil 12 may include a first compliant region 14 positioned between an inboard section 16 and a first outboard section 18 and may include a second compliant region 20 positioned between a second outboard section 22 and the inboard section 16. The compliant regions 14, 20 enable the first and second outboard sections 18, 22 to bend about a leading edge section 24. This action enables the first and second outboard sections 18, 22 to move relative to the inboard section 16, thereby enabling the angle of attack of the airfoil 12 to be modified for gust rejection. The airfoil 12 is thereby capable of smoother flight due to a change in the angle of attack, reduced drag due to the curvature of a leading edge section 24 and improved wind gust rejection due to adaptive washout as a result of the airfoil 12 flexing, twisting and decambering.

As shown in FIGS. 1-4, the airfoil 12 may be formed from a leading edge section 24 extending generally from a first tip 26 to a second tip 28 that is generally opposite to the first tip 26. The leading edge section 24 may be curved such that a bottom surface 30 forming a pressure side 32 of the airfoil 12 forms a portion of a concave pressure side 32. The leading edge section 24 may be bendable to enable the airfoil 12 to be easily stored in, for instance, a tube or other structure. The leading edge section 24 may be configured to bend in a first direction such that first and second tips 26, 28 of the leading edge section 24 may be bent towards the pressure side 32 of the airfoil 12 but may not bend substantially in a second, generally opposite direction toward a suction side 34 of the airfoil 12. The camber formed by the leading edge section 24 provides the airfoil 12 with the structural stability to substantially prevent airfoil 12 from bending upwardly when subjected to an upwardly directed load. The airfoil 12 can be bent with a downward force applied to the suction side 34 but not with an upward force applied to the pressure side 32 because of the configuration of the airfoil 12 and materials used to form the airfoil 12.

Figure 3:
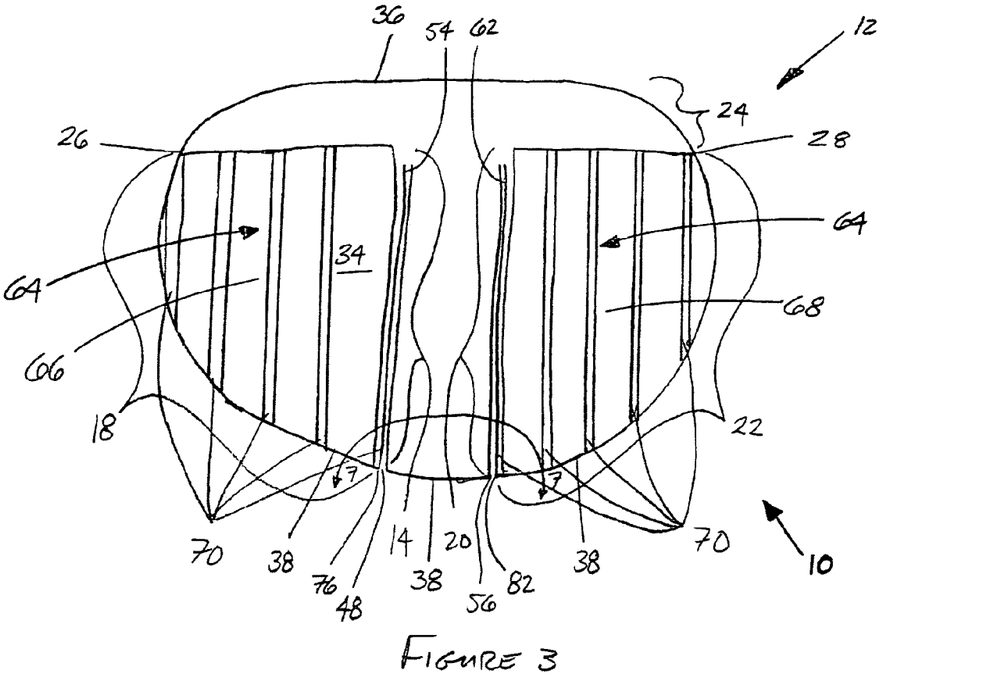
FIG. 3 is a top view of an alternative airfoil of this invention.
Figure 4:
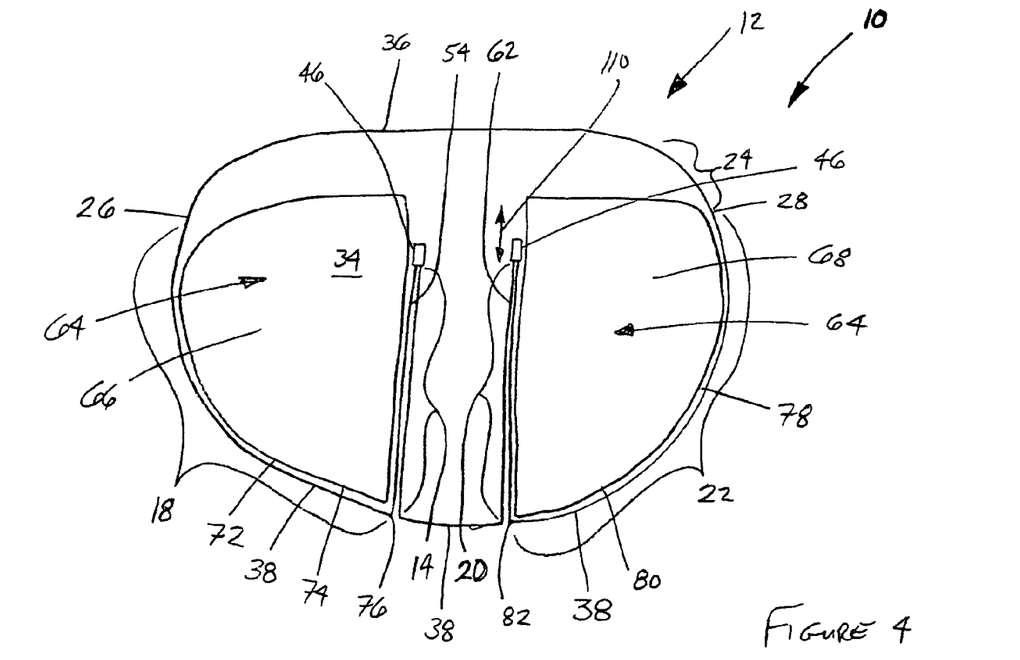
FIG. 4 is a top view of yet another alternative airfoil of this invention.

The airfoil 12 may have any appropriate overall shape. In at least one embodiment, as shown in FIGS. 2-4, the airfoil 12 may include a relatively straight leading edge 36 in the leading edge section 24 and may have a generally hemispherically shaped perimeter 39 forming a trailing edge 38 of the airfoil 12 extending from the first tip 26 to the second tip 28. The airfoil 12 is not limited to this configuration, but may have other appropriate configurations as well. In at least one embodiment, the airfoil 12, as shown in FIG. 2, may be formed from a single layer of material, and, in alternative embodiments, may be formed from two or more layers of material. The airfoil 12 may be formed from resilient materials, such as, but not limited to: fiber reinforced laminates and fabrics, such as, carbon fiber reinforced polymers, glass reinforced polymers, and aramid reinforced polymers; carbon fiber epoxy; foam materials; plastics, and other appropriate materials.

The airfoil 12 may include the inboard section 16 positioned between the first outboard section 18 and the second outboard section 22 and extending from the leading edge 36 to the trailing edge 38. The trailing edge 38 of the inboard section 16 may or may not be aligned with the trailing edge 38 of the first and second outboard sections 18, 22. In at least one embodiment, the inboard section 16 may be rigidly coupled to the leading edge section 24. In another embodiment, the inboard section 16 and the leading edge section 24 may be a monolithic structure formed from a carbon fiber epoxy material, an aramid fiber/epoxy mixture, or other appropriate lightweight material having sufficient flexibility and strength. The carbon fiber epoxy material may provide sufficient strength to absorb forces encountered from wind gusts while maintaining a sufficiently light weight. The carbon fiber weave may be a $+^-45$ degree configuration. In another embodiment, the carbon fiber weave may be a zero degree/90 degree configuration. The inboard section 16 may also support a fuselage 40 of a micro air vehicle 42. The fuselage 40 may or may not house an engine capable of providing rotational motion to a propeller 15. The engine may be, but is not limited to being, one of many conventional engines used to power miniature aircraft. The fuselage 40 may be configured to house a camera, which may be, but is not limited to being, a video camera, a still photography camera, or other audio or visual recording devices. A tail 44 may extend from the fuselage 40 or the airfoil 12, or both for controlling the micro air vehicle 10. The tail 44 may be positioned generally orthogonal to the airfoil 12, as shown in FIG. 1, generally parallel to the airfoil 12 or in another position. Micro air vehicle 10 may include other components that are typically found on miniature aircraft. The tail 44 may extend from the pressure side 32 of the suction side 34 of the airfoil 12, or both.

The airfoil 12 may also include a first compliant region 14 positioned between the first outboard section 18 and the inboard section 16. The first compliant region 14 may be configured to enable the first outboard section 18 to move relative to the inboard section 16 so that the angle of attack of the airfoil 12 may be changed in response to the airfoil 12 encountering a wind gust. The first compliant region 14 may extend from the trailing edge 38 toward the leading edge 36, as shown in FIG. 4. In one embodiment, the first compliant region 14 may extend from the trailing edge 38 toward the leading edge 36 and terminate in close proximity with the leading edge section 24, as shown in FIG. 3. In another embodiment, the first compliant region 14 may extend from the trailing edge 38 toward the leading edge 36 and terminate in contact with the leading edge section 24, as shown in FIG. 2. The first compliant region 14 may extend generally spanwise from the trailing edge 38 toward the leading edge 36. In one embodiment, the first compliant region 14 may be generally orthogonal to the leading edge 36.

As shown in FIG. 4, the airfoil 12 may include a flight tuning device 46 enabling the flight of the airfoil to be tuned. The airfoil 12 may be tuned by changing a length of the first compliant region 14. The longer the first compliant region 14 is constructed, the more compliant the first outboard section 18 is when loaded during flight. The flight tuning device 46 may be any device capable of changing the effective length of the first compliant region 14. The effective length of the first compliant region 14 is defined as being the length along which the first outboard section 18 is unrestrained relative to the adjacent inboard section 16. In at least one embodiment, the flight tuning device 46 may be a slidable fastener adapted to be attachable to the inboard section 16 and to the first outboard section 18 at different positions along the length of the first compliant region 14. The fastener 46 may be adjusted along the length of the second compliant region 20 in the direction shown by arrow 110.

In at least one embodiment, the first compliant region 14 may be a slot 48, as shown in FIG. 3, that extends from the trailing edge 38 toward the leading edge 36. The slot 48 may be sized to enable the first outboard section 18 to move relative to the inboard section 16 about the leading edge section 24. The leading edge section 24 may bend to enable the movement of the first outboard section 18 relative to the inboard section 16. The width of the slot 48 may be sized to enable this movement yet not be so large that pressure equalization occurs across the airfoil 12 through the slot 48. Thus, the slot 48 may have a width that is large enough to enable movement without restrictive friction between the first outboard section 18 and the inboard section 16, yet small enough to limit pressure equalization across the airfoil 12 through the slot 48.

A seal 50 may be positioned between the first outboard section 18 and the inboard section 16 to limit pressure equalization through the slot 48, as shown in FIG. 6. The seal 50 may be formed from any material capable of limiting pressure equalization through the slot 48 without creating friction inhibiting movement of the first outboard section 18. In at least one embodiment, the seal 50 may be formed from a flexible material, such as a feather, or other appropriate material.

Figure 5:
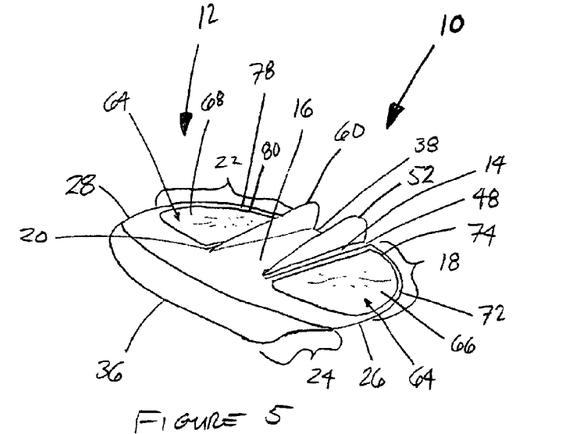
FIG. 5 is a perspective view of still another alternative airfoil of this invention.

In another embodiment, the seal 50 may include an end plate 52, as shown in FIG. 5, extending from the suction side 34 of the airfoil 12 proximate to the slot 48 for limiting pressure equalization through the slot 48. The end plate 52 may be positioned such that as the first outboard section 18 moves relative to the inboard section 16, an inner edge 54 of the first outboard section 18 moves in close proximity to the end plate 52 thereby maintaining a small gap between the first outboard section 18 and the end plate 52. The end plate 52 may also extend from the pressure side 32 of the airfoil 12.

In another embodiment, as shown in detail in FIG. 7, the first compliant region 14 may be formed from a flexible material attached to the first outboard section 18 and attached to the inboard section 16, wherein a length of the material may be greater than a distance between the first outboard section 18 and the inboard section 16, thereby permitting the first outboard section 18 to bend about the leading edge section 24 relative to the inboard section 16. In such a configuration, the first compliant region 14 may be formed from a material, such as, but not limited to, latex, or other appropriate material enabling the first outboard section 18 to move relatively unencumbered relative to the inboard section 16. The material may prevent pressure equalization across the airfoil 12 through the first compliant region 14.

The second compliant region 20 may be formed in the same configurations as the first compliant region 14, as set forth above. In particular, the second compliant region 20 may be positioned between the second outboard section 22 and the inboard section 16. The second compliant region 20 may be configured to enable the second outboard section 22 to move relative to the inboard section 16 so that the angle of attack of the airfoil 12 may be changed in response to the airfoil 12 encountering a wind gust. The second compliant region 20 may extend from the trailing edge 38 toward the leading edge 36, as shown in FIG. 4. In one embodiment, the second compliant region 20 may extend from the trailing edge 38 toward the leading edge 36 and terminate in close proximity with the leading edge section 24, as shown in FIG. 3. In another embodiment, the second compliant region 20 may extend from the trailing edge 38 toward the leading edge 36 and terminate in contact with the leading edge section 24, as shown in FIG. 2. The second compliant region 20 may extend generally spanwise from the trailing edge 38 toward the leading edge 36. In one embodiment, the second compliant region 20 may be generally orthogonal to the leading edge 36.

As shown in FIG. 4, a flight tuning device 46 may enable the flight of the airfoil to be tuned by changing a length of the second compliant region 20. The longer the second compliant region 20 is constructed, the more compliant the second outboard section 22 is when loaded during flight. The flight tuning device 46 may be any device capable of changing the effective length of the second compliant region 20. The effective length of the second compliant region 20 is defined as being the length along which the second outboard section 22 is unrestrained relative to the adjacent inboard section 16. In at least one embodiment, the flight tuning device 46 may be a sidable fastener 46, as shown in FIG. 4, adapted to be attachable to the inboard section 16 and to the second outboard section 22 at different positions along the length of the second compliant region 20. The fastener 46 may be adjusted along the length of the second compliant region 20 in the direction shown by arrow 110.

In at least one embodiment, the second compliant region 20 may be a slot 56, as shown in FIG. 3, that extends from the trailing edge 38 toward the leading edge 36. The slot 56 may be sized to enable the second outboard section 22 to move relative to the inboard section 16 about the leading edge section 24. The leading edge section 24 may bend to enable the movement of the second outboard section 22 relative to the inboard section 16. The width of the slot 56 may be sized to enable this movement yet not be so large that pressure equalization occurs across the airfoil 12 through the slot 56. Thus, the slot 56 may have a width that is large enough to enable movement without restrictive friction between the second outboard section 22 and the inboard section 16, yet small enough to limit pressure equalization across the airfoil 12 through the slot 56.

A seal 58 may be positioned between the second outboard section 22 and the inboard section 16 to limit pressure equalization through the slot 56, as shown in FIG. 6. The seal 58 may be formed from any material capable of limiting pressure equalization through the slot 56 without creating friction inhibiting movement of the second outboard section 22. In at least one embodiment, the seal 58 may be formed from a flexible material, such as a feather, or other appropriate material.

In another embodiment, as shown in FIG. 7, the seal 58 may include an end plate 60, as shown in FIG. 5, extending from the suction side 34 of the airfoil 12 proximate to the slot 56 for limiting pressure equalization through the slot 56. The end plate 60 may be positioned such that as the second outboard section 22 moves relative to the inboard section 16, an inner edge 62 of the second outboard section 22 moves in close proximity to the end plate 60 thereby maintaining a small gap between the second outboard section 22 and the end plate 60. The end plate 60 may also extend from the pressure side 32 of the airfoil 12.

In another embodiment, the second compliant region 20 may be formed from a flexible material attached to the second outboard section 22 and attached to the inboard section 16, wherein a length of the material is greater than a distance between the second outboard section 22 and the inboard section 16, thereby permitting the second outboard section 22 to bend about the leading edge section 24 relative to the inboard section 16. In such a configuration, the second compliant region 20 may be formed from a material, such as, but not limited to, latex, or other appropriate material enabling the second outboard section 22 to move relatively unencumbered relative to the inboard section 16. The material may prevent pressure equalization across the airfoil 12 through the second compliant region 20.

The airfoil 12 may include one or more camber adjustable regions 64 capable of changing camber in response to a wind gust. By changing camber, the airfoil 12 is able to fly smoother than conventional airfoils without such compliant regions 64. The camber adjustable regions 64 may form a portion of the pressure side 32 facing downward, wherein the material improves wind gust rejection due to the changing camber and due to adaptive washout as a result of the material flexibly decambering, as shown in FIG. 5 wherein the material flexes toward the suction side 34. The airfoil 12 may include a first camber adjustable region 66 positioned in the first outboard section 18 and a second camber adjustable region 20 positioned in the second outboard section 22. The first and second camber adjustable regions 66, 68 may extend from the leading edge section 24 to the trailing edge 38 and may form the trailing edge 38. The first and second camber adjustable regions 66, 68 may also extend from the first and second compliant regions 14, 20, to the first and second tips 26, 28 of the airfoil 12, respectively. The first and second camber adjustable regions 66, 68 may be supported by one or more battens 70, as shown in FIG. 3, that are formed from a relatively rigid material to add structural support to the first and second camber adjustable regions 66, 68. In at least one embodiment, the battens 70 may be formed from the same material used to form the leading edge section 24.

In another embodiment, as shown in FIGS. 2, 4, 6, and 7, the airfoil 12 may also include a first outboard section perimeter support structure 72 attached to a perimeter 74 of the first outboard section 18. The first outboard perimeter support structure 72 may, in at least one embodiment, extend from the first tip 26 of the airfoil 12 along the trailing edge 38 to a point 76 at an intersection between the trailing edge 38 and the first compliant region 14. The first outboard perimeter support structure 72 may extend along the intersection of the first outboard section 18 and the first compliant region 14 from the trailing edge 38 toward the leading edge 36. In another embodiment, a batten 70 may be used to support the first camber adjustable region 66 at the intersection between the first outboard section 18 and the first compliant region 14. The first outboard perimeter support structure 72 may be relatively thin in width sufficient to provide support yet not wide enough to inhibit decambering of the first camber adjustable region 66.

The airfoil 12 may also include a second outboard section perimeter support structure 78 attached to a perimeter 80 of the second outboard section 22. The second outboard section perimeter support structure 78 may, in at least one embodiment, extend from the second tip 28 of the airfoil 12 along the trailing edge 38 to a point 82 at an intersection between the trailing edge 38 and the second compliant region 20. The second outboard perimeter support structure 78 may extend along the intersection of the second outboard section 22 and the second compliant region 20 from the trailing edge 38 toward the leading edge 36. In another embodiment, a batten 70 may be used to support the second camber adjustable region 68 at the intersection between the second outboard section 22 and the second compliant region 20. The second outboard perimeter support structure 78 may be relatively thin in width sufficient to provide support yet not wide enough to inhibit decambering of the second camber adjustable region 68.

In at least one embodiment, at least a portion of the airfoil 12 may be monolithic. In particular, in one embodiment, the leading edge section 24 and the inboard section 16 may be monolithic. The monolithic structure forming the leading edge section 24 and the inboard section 16 may be formed from a carbon fiber epoxy material or other appropriate lightweight material having sufficient flexibility and strength. The carbon fiber weave may be a $^{+-}45$ degree configuration. In another embodiment, the carbon fiber weave may be a zero degree/90 degree configuration. In another configuration, the leading edge section 24, the inboard section 16, the first outboard section perimeter support structure 72, and the second outboard section perimeter support structure 78 may form a monolithic structure. This monolithic structure may also be formed from a carbon fiber epoxy material or other appropriate lightweight material having sufficient flexibility and strength.

During use, the airfoil 12 operates to create lifting forces imparted on the pressure side 32 of the airfoil 12. Upon encountering a wind gust, the first and second compliant regions 14, 20 may move upward, toward the suction side 34 relative to the inboard section 16. The first and second compliant regions 14, 20 may move upward by bending the leading edge section 24 relative to the inboard section 16. This movement reduces the angle of attack, thereby enabling the airfoil 12 to reject a wind gust. In addition, the first and second camber adjustable regions 66, 68 on the airfoil 12 may change their camber in response to a wind gust, as shown in FIG. 5, as a result of the material that forms the first and second camber adjustable regions 66, 68 flexing toward the suction side. After the gust has passed, the airfoil 12 returns to its original shape because of the elastic characteristics of the leading edge section 24. These forces abate only when airfoil 12 is returned to its original position. The materials used to form the airfoil 12 have great flexibility and elasticity and bend rather than yielding permanently.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. An airfoil for a micro air vehicle, comprising:
a leading edge section extending from a first tip to a second tip;
an inboard section extending from the leading edge section toward a trailing edge of the airfoil;
a first outboard section extending from the leading edge section toward the trailing edge of the airfoil and positioned on a first side of the inboard section;
a second outboard section extending from the leading edge section toward the trailing edge of the airfoil and positioned on a second side of the inboard section that is opposite to the first side;
at least one compliant region positioned between the first outboard section and the inboard section and extending from proximate the leading edge section to the trailing edge enabling the first outboard section to move relative to the inboard section about the leading edge section; and
at least one compliant region positioned between the second outboard section and the inboard section and extending from proximate the leading edge section to the trailing edge enabling the second outboard section to move relative to the inboard section about the leading edge section;
wherein the at least one compliant region positioned between the first outboard section and the inboard section comprises at least one slot extending from proximate the leading edge section to the trailing edge; and
a seal positioned between the first outboard section and the inboard section enabling the first outboard section to move relative to the inboard section by bending about the leading edge section while substantially preventing equalization of pressure from a pressure side to a suction side of the airfoil through the at leapt one compliant region positioned between the first outboard section and the inboard section.

2. The airfoil for a micro air vehicle of claim 1, wherein the seal comprises an end plate extending from a suction side of the airfoil proximate to the at least one slot for limiting pressure equalization through the slot of the airfoil.

3. The airfoil for a micro air vehicle of claim 1, wherein the at least one slot positioned between the first outboard section and the inboard section comprises a slot extending generally chordwise from the leading edge section to the trailing edge.

4. The airfoil for a micro air vehicle of claim 1, wherein the at least one compliant region positioned between the first outboard section and the inboard section comprises material attached to the first outboard section and attached to the inboard section, wherein a length of the material is greater than a distance between the first outboard section and the inboard section, thereby permitting the first outboard section to move about the leading edge section relative to the inboard section.

5. The airfoil for a micro air vehicle of claim 4, wherein the at least one compliant region positioned between the second outboard section and the inboard section comprises material attached to the second outboard section and attached to the inboard section, wherein a length of the material is greater than a distance between the second outboard section and the inboard section, thereby permitting the second outboard section to move about the leading edge section relative to the inboard section.

6. The airfoil for a micro air vehicle of claim 1, wherein the at least one compliant region positioned between the second outboard section and the inboard section comprises at least one slot extending from proximate the leading edge section to the trailing edge.

7. The airfoil for a micro air vehicle of claim 6, further comprising a seal positioned between the second outboard section and the inboard section enabling the second outboard section to move relative to the inboard section by bending about the leading edge section while substantially preventing equalization of pressure from a pressure side to a suction side of the airfoil through the at least one compliant region.

8. The airfoil for a micro air vehicle of claim 7, wherein the seal between the second outboard section and the inboard section comprises an end plate extending from a suction side of the airfoil proximate to the at least one slot for limiting pressure equalization through the slot of the airfoil.

9. The airfoil for a micro air vehicle of claim 6, wherein the at least one slot positioned between the second outboard section and the inboard section comprises a slot extending generally chordwise from the leading edge section to the trailing edge.

10. The airfoil for a micro air vehicle of claim 1, further comprising a first camber adjustable region forming at least a portion of the first outboard section and formed from at least one layer of a flexible material that includes a camber forming a concave surface facing downward and improves wind gust rejection due to adaptive washout as a result of the material flexibly decambering.

11. The airfoil for a micro air vehicle of claim 10, further comprising a second camber adjustable region forming at least a portion of the second outboard section and formed from at least one layer of a flexible material that includes a camber forming a concave surface facing downward and improves wind gust rejection due to adaptive washout as a result of the material flexibly decambering.

12. The airfoil for a micro air vehicle of claim 11, further comprising a first outboard section perimeter support structure positioned at the perimeter of the first outboard section and attached to the leading edge section.

13. The airfoil for a micro air vehicle of claim 12, further comprising a second outboard section perimeter support structure positioned at the perimeter of the first outboard section and attached to the leading edge section.

14. The airfoil for a micro air vehicle of claim 13, wherein the leading edge section, the inboard section, the first outboard section perimeter support structure, and the second outboard section perimeter support structure comprise a monolithic structure.

15. The airfoil for a micro air vehicle of claim 11, wherein the flexible material comprising the first and second camber adjustable regions is latex.

16. The airfoil for a micro air vehicle of claim 10, wherein the first camber adjustable region includes one or more battens extending from the leading edge section toward the trailing edge and is attached to the at least one layer of a resilient, flexible material.

17. The airfoil for a micro air vehicle of claim 16, wherein the second camber adjustable region includes one or more battens extending from the leading edge section toward the trailing edge and is attached to the at least one layer of a resilient, flexible material.

18. The airfoil for a micro air vehicle of claim 1, wherein the leading edge section is formed from a carbon fiber epoxy.

19. The airfoil for a micro air vehicle of claim 1, further comprising a flight tuning device in communication with the at least one compliant region positioned between the first outboard section and the inboard section for changing an effective length of the at least one compliant region positioned between the first outboard section and the inboard sections to tune flight characteristics of the airfoil.

20. An airfoil for a micro air vehicle, comprising:
a leading edge section extending from a first tip to a second tip including a leading edge;
an inboard section extending from the leading edge section toward a trailing edge of the airfoil;
a first outboard section extending from the leading edge section toward the trailing edge of the airfoil and positioned on a first side of the inboard section;
a second outboard section extending from the leading edge section toward the trailing edge of the airfoil and positioned on a second side of the inboard section that is opposite to the first side;
at least one compliant region positioned between the first outboard section and the inboard section and extending from proximate the leading edge section toward the trailing edge enabling the first outboard section to move relative to the inboard section by bending about the leading edge wherein the leading edge acts as an axis of rotation that is non-parallel with the complaint region;
at least one compliant region positioned between the second outboard section and the inboard section and extending from proximate the leading edge section toward the trailing edge enabling the second outboard section to move relative to the inboard section by bending about the leading edge wherein the leading edge acts as an axis of rotation that is non-parallel with the complaint region;
a first outboard perimeter support structure positioned at a perimeter of the first outboard section and attached to the leading edge section; and
a second outboard perimeter support structure positioned at a perimeter of the second outboard section and attached to the leading edge section.

21. The airfoil for a micro air vehicle of claim 20, wherein the leading edge section, the inboard section, the first outboard perimeter support structure, and the second outboard perimeter support structure comprise a monolithic structure.

22. The airfoil for a micro air vehicle of claim 21, wherein the monolithic structure is formed from a carbon fiber epoxy.

23. The airfoil for a micro air vehicle of claim 20, wherein the at least one compliant region positioned between the first outboard section and the inboard section comprises at least one slot extending from proximate the leading edge section to the trailing edge.

24. The airfoil for a micro air vehicle of claim 23, further comprising a seal positioned between the first outboard section and the inboard section enabling the first outboard section to move relative to the inboard section by bending about the leading edge section while substantially preventing equalization of pressure from a pressure side to a suction side of the airfoil through the at least one compliant region.

25. The airfoil for a micro air vehicle of claim 24, wherein the seal comprises an end plate extending from a suction side of the airfoil proximate to the at least one slot for limiting pressure equalization through the slot of the airfoil.

26. The airfoil for a micro air vehicle of claim 23, wherein the at least one slot positioned between the first outboard section and the inboard section comprises a slot extending generally chordwise from the leading edge section to the trailing edge.

27. The airfoil for a micro air vehicle of claim 20, wherein the at least one compliant region positioned between the first outboard section and the inboard section comprises material attached to the first outboard section and attached to the inboard section, wherein a length of the material is greater than a distance between the first outboard section and the inboard section, thereby permitting the first outboard section to move relative to the inboard section by bending about the leading edge section.

28. The airfoil for a micro air vehicle of claim 20, wherein at least a portion of the first outboard section is formed from at least one layer of a flexible material that includes a camber forming a concave surface facing downward and improves wind gust rejection due to adaptive washout as a result of the material flexibly decambering; and wherein at least a portion of the second outboard section is formed from at least one layer of a flexible material includes a camber forming a concave surface facing downward, and improves wind gust rejection due to adaptive washout as a result of the material flexibly decambering.

29. The airfoil for a micro air vehicle of claim 28, wherein the first outboard section includes one or more battens extending from the leading edge section toward the trailing edge and is attached to the flexible material of the first camber adjustable region, and wherein the second outboard section includes one or more battens extending from the leading edge section toward the trailing edge and is attached to the flexible material of the second camber adjustable region.

30. The airfoil for a micro air vehicle of claim 29, wherein the flexible material comprising the first and second camber adjustable regions is latex.

31. An airfoil for a micro air vehicle, comprising:
a leading edge section extending from a first tip to a second tip;
an inboard section extending from the leading edge section toward a trailing edge of the airfoil;
a first outboard section extending from the leading edge section toward the trailing edge of the airfoil and positioned on a first side of the inboard section;
a second outboard section extending from the leading edge section toward the trailing edge of the airfoil and positioned on a second side of the inboard section that is opposite to the first side;
at least one compliant region positioned between the first outboard section and the inboard section and extending from proximate the leading edge section to the trailing edge enabling the first outboard section to move relative to the inboard section about the leading edge section;
at least one compliant region positioned between the second outboard section and the inboard section and extending from proximate the leading edge section to the trailing edge enabling the second outboard section to move relative to the inboard section about the leading edge section;

a first camber adjustable region forming at least a portion of the first outboard section and formed from at least one layer of a flexible material that includes a camber forming a concave surface facing downward and improves wind gust rejection due to adaptive washout as a result of the material flexibly decambering;

a second camber adjustable region forming at least a portion of the second outboard section and formed from at least one layer of a flexible material that includes a camber forming a concave surface facing downward and improves wind gust rejection due to adaptive washout as a result of the material flexibly decambering; and wherein the first camber adjustable region includes one or more battens extending from the leading edge section toward the trailing edge and is attached to the at least one layer of a resilient, flexible material.

32. The airfoil for a micro air vehicle of claim 31, wherein the second camber adjustable region includes one or more battens extending from the leading edge section toward the trailing edge and is attached to the at least one layer of a resilient, flexible material.

33. The airfoil for a micro air vehicle of claim 31, further comprising a first outboard section perimeter support structure positioned at the perimeter of the first outboard section and attached to the leading edge section.

34. The airfoil for a micro air vehicle of claim 33, further comprising a second outboard section perimeter support structure positioned at the perimeter of the first outboard section and attached to the leading edge section.

35. The airfoil for a micro air vehicle of claim 34, wherein the leading edge section, the inboard section, the first outboard section perimeter support structure, and the second outboard section perimeter support structure comprise a monolithic structure.

36. The airfoil for a micro air vehicle of claim 31, wherein the flexible material comprising the first and second camber adjustable regions is latex.

37. An airfoil for a micro air vehicle, comprising:

a leading edge section extending from a first tip to a second tip;

an inboard section extending from the leading edge section toward a trailing edge of the airfoil;

a first outboard section extending from the leading edge section toward the trailing edge of the airfoil and positioned on a first side of the inboard section;

a second outboard section extending from the leading edge section toward the trailing edge of the airfoil and positioned on a second side of the inboard section that is opposite to the first side;

at least one compliant region positioned between the first outboard section and the inboard section and extending from proximate the leading edge section to the trailing edge enabling the first outboard section to move relative to the inboard section about the leading edge section;

at least one compliant region positioned between the second outboard section and the inboard section and extending from proximate the leading edge section to the trailing edge enabling the second outboard section to move relative to the inboard section about the leading edge section; and a flight tuning device in communication with the at least one compliant region positioned between the first outboard section and the inboard section for changing an effective length from proximate the leading edge section to the trailing edge of the at least one compliant region positioned between the first outboard section and the inboard sections to tune flight characteristics of the airfoil.

* * * * *